United States Patent Office

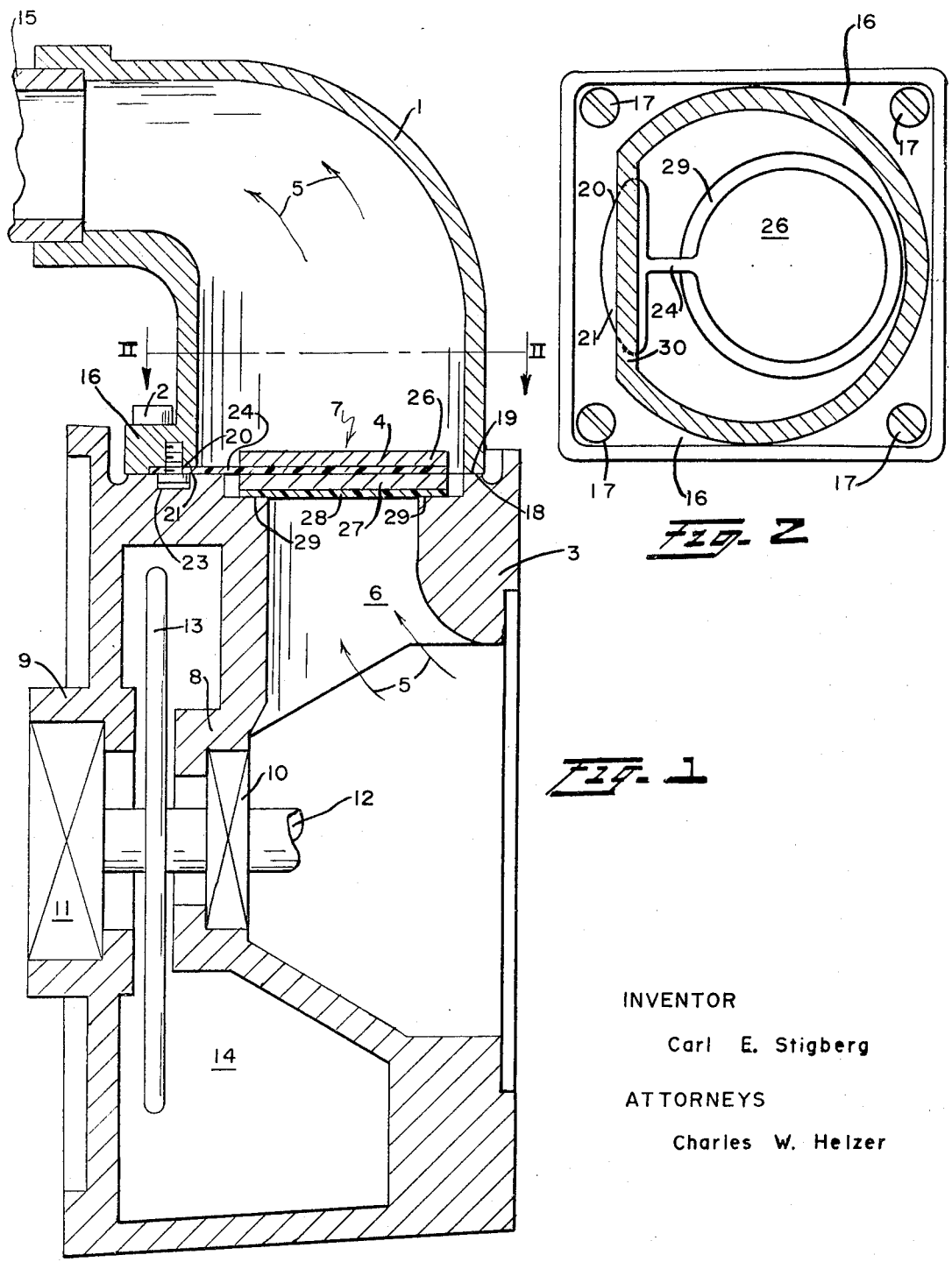

3,664,775
Patented May 23, 1972

3,664,775
CHECK VALVE
Carl E. Stigberg, Schenectady, N.Y., assignor to
Environment/One Corporation, Latham, N.Y.
Continuation-in-part of application Ser. No. 867,793,
Oct. 20, 1969. This application Jan. 5, 1970, Ser.
No. 573
Int. Cl. F04b *21/02;* F16k *15/00*
U.S. Cl. 417—566
15 Claims

ABSTRACT OF THE DISCLOSURE

A pump assembly employing a one-way flapper valve directly between the cast head of a pump and the cast flow directing elbow for external connection, which elbow is bolted to the head. The flapper valve employs a polypropylene sheet having an enlarged mounting portion secured in a recess to the elbow and clamped between the elbow recess and the head where the elbow is bolted to the head. A reduced thickness hinge portion allows universal movement of the valve sealing portion of the sheet with respect to the mounting portion, which sealing portion has brass weights laminated to its opposite sides and a rubber sheet laminated to the other side of one of the brass weights for engaging a valve seat machined around the periphery of the head discharge port. Particularly for corrosive heads a sealing resilient ring is bonded in an annular groove in the head around the head discharge port for sealing engagement with the adjacent flapper brass weight, which structure replaces the rubber sheet. Mating machined surfaces on the head and elbow, as well as a chordal portion of the otherwise circular elbow provide a secure clamping of the polypropylene sheet so that its hinged portion will always return the valve to its normal sealing position whenever pressure falls below a predetermined level, which action is assisted by the weights.

BACKGROUND OF THE INVENTION

The present application is a continuation-in-part of my application Ser. No. 867,793, filed Oct. 20, 1969, for "PSG–02 Check Valve" having docket number HD–5054, now abandoned.

It is known to provide a one-way or check valve on the discharge side of a pump to prevent the pumped medium from flowing back into a storage tank or other area whenever the pump ceases to operate. However, such a placement of a valve has usually been accomplished at the expense of other design considerations. For example, prior art check valves have usually interferred with the optimum design of conduits from the pump discharge to the point of usage, required additional conduit parts, materially increased the bulk of the entire unit, considerably increased cost by necessitating additional parts, increased maintenance and leakage because of these additional parts, removed the check valve from its optimum position immediately adjacent a discharge of the pump, and blocked access to the motor shaft end for freeing any possible grinder jams or otherwise preventing maintenance to the various parts of the unit.

Further, when the pump heads are made from a material that is corroded by the pumped liquid, leakage and valve sticking can occur due to corrosion of the head valve seat.

SUMMARY OF THE INVENTION

The present invention overcomes or minimizes the above disadvantages of the prior art by placing the check valve immediately between the pump head and a discharge member. Since the head and member would be required even if a check valve were not used, a minimum number of parts are employed.

Assembly is facilitated in that the flapper element of the check valve may be precisely located in a mating recess of the elbow discharge member at any convenient time during assembly prior to assembling the unit; a relatively small single releasable fastener may be employed to lightly secure the flapper element to the discharge elbow, because this securement needs only to be strong enough to prevent accidental separation of the flapper element from the discharge elbow. Any moments about the fastener that would tend to move the flapper element out of alignment with the discharge elbow are positively resisted by the conforming shape of the recess in which the mounting portion of the flapper element is retained; thus, the releasable fastener does not have to counteract these moments with the result that the releasable fastener may be small enought in size due to its allowed weakness so that it may be accommodated in the normal flange of the discharge elbow that is necessary for its mounting on its head.

During assembly of the discharge elbow with the pump head, the flapper element may be completely ignored with resulting assembly efficiency in that the position of the flapper element is already determined as noted above and the cantilevered sealing portion of the flapper element will be held in position due to the inherent spring bias of the flapper hinge portion. The considerable stresses to which the flapper is subjected will be successfully resisted by the mounting portion in that the mounting portion will be securely clamped between the bottom of the discharge elbow recess and a mating surface of the pump head, when the discharge elbow is bolted to the pump head. For this purpose, the discharge elbow is preferably constructed with a chordal portion overlying the width of the flapper mounting portion to efficiently clamp the mounting along a maximum width immediately adjacent to the flapper hinge. For balance purposes, weights are bonded to each side of the polypropylene sheet employed in constructing the flapper element which weights will assist in returning the flapper element to its normal sealed position, wherein a rubber sheet bonded to one of the weights will sealingly engage a seat machined into the head around the periphery of its discharged port.

Alternately, the rubber sheet may be replaced by a resilient sealing ring bonded or otherwise secured within an annular groove in the pump head and around the periphery of the pump head discharged port. This construction has the advantage that the generally noncorrosive weight seals against the resilient ring, so that sealing is independent of any head corrosion.

BRIEF DESCRIPTION OF THE DRAWING

Further objects, features and advantages of the present invention will become more clear from the following detailed description of the drawings, wherein:

FIG. 1 is a cross-sectional view through the rotational axis of a pump head showing the discharge member and check valve mounting of the present invention, with portions of supporting structure partially indicated to show the environment;

FIG. 2 is a cross-sectional view of the discharge elbow and flapper check valve of the present invention taken along line II—II of FIG. 1.

DETAILED DESCRIPTION OF THE INVENTION

Figure 3:
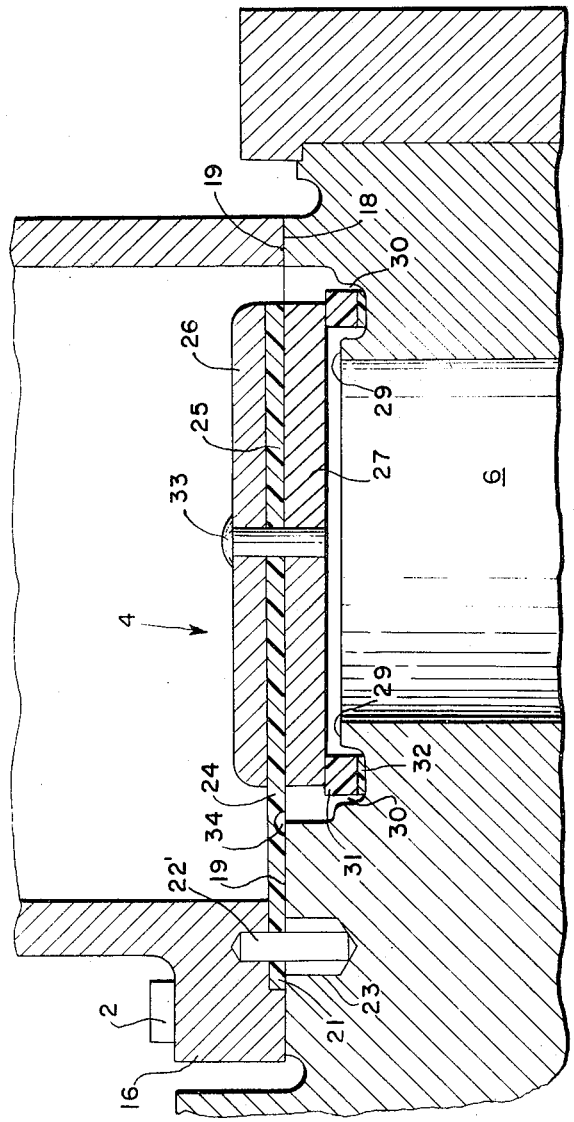
FIG. 3 is a partial view similar to FIG. 1, but of another embodiment of the present invention.

As shown in FIG. 1, the right angle discharge elbow 1 is secured by a plurality of bolts 2 to a pump head 3, with the flapper element 4 clamped therebetween. The arrows 5 show the flow of fluid from the discharge port 6 to the interior of the discharge elbow 1 with the flapper element 4 interposed and biased to its normal illustrated closed position wherein it seals against the periphery of the discharge port 6 to form a one-way valve 7.

In detail, the pump head 3 or motor head is cast of a suitable material, which may be a synthetic plastic, so that it is provided with adjacent mounting flanges 8, 9 for respectively receiving therein a bearing 10 and a seal 11. The bearing 10 rotatably supports a pump impeller shaft 12, which in a known manner carries a pump impeller that will pump fluid through the discharge port 6, in the direction of the arrows 5; with the impeller attached to the shaft 12, its driving and other supporting structure may be of any conventional type; they have not been shown in detail. Intermediate the bearing 10 and the seal 11, the shaft 12 carries a slinger disc 13, which will in a known manner sling any liquid passing through the seal 10 radially outwardly by centrifugal force into the slinger collection chamber 14, from which it may be drained or otherwise removed.

The discharge element 1 is used to direct the flow of fluid after it leaves the discharge port 6 and to provide a suitable coupling for a conduit 15, or the like. As shown in FIGS. 1 and 2, the discharge elbow 1 is provided with a rectangular mounting flange 16 which is provided with a mounting bore 17 at each of its four corners. A bolt 2 extends through each of the bores 17 and threads into suitable threaded bores (not shown) in the pump head 3. Preferably, mating face 18 on the discharge elbow 1 and surface 18 on the pump head 3 are machined to provide an accurate seal around the entire periphery of the discharge port 6. However, it is understood that these surfaces may alternately be cast or otherwise formed.

The one-way valve 7 is mounted between the pump head 3 and the discharge elbow 1 by means of a recess 20 that is machined into the elbow face 18 to exactly conform in shape and depth to the shape and thickness of the mounting portion 21 of the flapper element 4. When the discharge elbow 1 is clamped to the pump head 3 by means of the bolts 2, the mounting portion 21 is securely clamped between the bottom surface of the recess 20 in the discharge elbow 1 and the machined surface 19 of the pump head 3. For purposes of further securing the mounting portion 21, particularly during handling of the discharge elbow 1 prior to and during assembly, there is provided a machine screw 22 or other releasable or permanent fastener, the head of which extends into a complementarily formed recess 23 in the pump head 3. This screw 22 may be relatively small and correspondingly weak, because it does not take the full force of valve activity, which is taken by the clamping of the mounting portion 21 and this fastening screw must only be strong enough to retain the mounting portion 21 within the recess 20 during and prior to assembly. Thus, the screw 22 may be accommodated within the normal dimensions of the flange 16 and does not dictate any greater bulk to the discharge elbow 1. Similarly, the recess 23 does not necessitate any enlargement of the adjacent wall of the pump head 3, which necessarily must be thick to accommodate the normally present bolts 2. Thus, no additional or unusual bulk is present in the discharge elbow 1 or the pump head 3 that is dictated by the mounting of the flapper element 4.

The flapper element 4 includes a uniform thickness sheet of polypropylene, which is cut or otherwise formed to have three distinct portions, that is, the generally oblong mounting portion 21, the reduced width hinge portion 24, and the generally circular sealing portion 25. The sealing portion 25 and the mounting portion 21 are of substantially the same width, with the latter being slightly smaller. The hinge portion 24 is of a width sufficient to allow universal tilting, rotation, and pivoting of the sealing portion 25 as a whole with respect to the mounting portion 21 during operation of the one-way valve. On opposite faces of and coextensive with the sealing portion 25, there are bonded, screwed, etc. through two brass disc weights 26, 27 that balance each other with respect to the axis of the polypropylene sheet and which form a bias in addition to the inherent bias of the hinge portion 24 to move the flapper element 4 into its indicated normal closed position. For this purpose, the pump assembly may assume a vertical position as illustrated in FIG. 1 or a position rotated 90° clockwise therefrom. A resilient sheet of rubber 28, which is circular, is bonded to the surface of the weight 27, that is, opposite from the polypropylene sheet 21, 24, 25. This resilient sheet 28, in the normal position of the one-way valve, sealingly engages the periphery of the discharge port 6, and preferably engages a peripheral surface 29 machined into the pump head 3. It is contemplated that other materials may be used, but a synthetic plastic is preferred for the sheet 21, 24, 25.

The discharge elbow 1 is tubular and preferably circular so that it may readily receive, in a releasable manner by conventional means, the conduit 15. However, as shown in FIG. 2, the portion of the discharge elbow 1 adjacent to the head 3 is constructed with a chordal wall 30 so that it may follow and support the major axis of the oblong mounting portion 21 closely adjacent to the hinged portion 24 to assure that the mounting portion 21 will securely be held in position regardless of the gyrations experienced by the sealing portion during the normal pressure fluctuations encountered in the fluid as it is pumped through the discharge port 6 and also to accommodate the sealing portion in its "full open" position.

The embodiment of FIG. 3 is identical in all respects to the embodiment of FIGS. 1 and 2, except for the following differences. For this reason, only a portion of the common structures of FIGS. 1 and 2 have been shown in FIG. 3 and the differences will be described therewith as follows with the understanding that all of the structure common to the two embodiments is equally important in each of the embodiments although not shown in FIG. 3.

In the embodiment of FIG. 3, the machined surface 29 of the pump head has an annular groove 30 therein surrounding the discharge port 6 and opening toward the flapper element 4. A rivet 33 securely fastens the weights 27 and 26 to the sealing portion 25. The weight 27, which is constructed of brass or other material non-corrosive to water, engages, as shown in the closed position of the valve, its periphery with an annular resilient sealing ring 31 that is secured within the annular groove 30 by means of an adhesive 32. For purposes of illustration, the port 6 has been considered as circular, but it may be of any other shape as may be the groove 30 and ring 31, but preferably they are complementary. Similarly, the ring 31 may be secured within the groove 30 in other manners or may be bonded or the like directly to the surface 29 without the presence of groove 30. In any event, the ring 31 extends axially, with respect to the discharge port 6, beyond the surface 29 for engagement with the weight 27. A roll pin or spring pin 22' holds the mounting portion 21 securely to the flange 16.

Thus, when the pump head 3 is constructed of a water corrosive material, such as cast iron, corrosion of the surface 29 will not affect the sealing between the non-corrosive weight 27 and the sealing ring 31, which ring may be of a synthetic resilient material, rubber or other common gasket material. Further, this construction will resist fouling due to sludge or the like that is carried in the fluid passing through the valve, because the fluid will tend to cleanse the sealing surface of the weight 27 in the open position and the projecting narrow ring 31 will resist the accumulation of fouling solids.

As shown in FIG. 2, the flapper element has an axis of symmetry that passes generally through the mounting portion 21, the hinge portion 24 and the sealing portion 25. As shown in FIG. 3, the hinge portion 24 is provided with a groove 34 that extends transversely with respect to the axis of symmetry from one side to the other of the hinge portion and opens toward the pump head. Preferably, this groove 34 is axially, with respect to the axis of the discharge port 6, aligned with the transition edge between the surface 19 and the surface 29 of the pump head so that it will relieve the stresses that would otherwise be produced by the edge at this area. Thus, the groove 34 has a dual function of first providing increased hinge flexibility of the portion 24 by reducing the thickness of the hinge portion 24 along a line transverse to its axis of symmetry and at the same time increasing the fatigue strength of the hinge portion 24 by relieving the stresses that would otherwise be concentrated at the edge of the relatively hard surface 19. For purposes of comparison, it is seen that with the structure as shown in FIG. 1, the edge of the surface 19 at the transition to the surface 29 will form a fulcrum line for bending of the hinge portion 24, at which line the bending stresses will concentrate to eventually cause fatigue breakage along this line. With the groove 34 of the FIG. 3 embodiment, this stress concentration is advantageously avoided and not reproduced elsewhere to the same degree because only flat surfaces of the relatively hard pump head will engage the hinge portion 24.

Although a right angle discharge elbow has been illustrated with respect to the preferred embodiment, it is contemplated that other types of discharge members may be employed; for example a straight coupling, or the like, as is conventional with pumps. Also, a specific type of pump head has been illustrated again for purposes of a preferred embodiment, but it is understood that the term "pump head," according to its broad usage, is the full equivalent of any other type of pump member having therein the normal discharge port of its associated pump. That is, the main feature of the present invention is that the one-way valve is specifically constructed along with its specific mounting features in the two associated pump members so that there will be no change in existing pumps or no changes in pumps to be designed, dictated solely by the inclusion of a one-way valve, except for at most the removal of surplusage material to accommodate the mounting portion of the flapper element, the fastener for the flapper element, and the valve seat. All of this is accomplished with a minimum of expense, a minimum number of parts and a minimum disturbance of the normal fluid flow from the pump. With this in mind, it is deemed that the present invention in its broader aspects encompasses many modifications, variations and embodiments, other than those specifically illustrated with respect to the preferred embodiment, which was described in detail only for purposes of illustration. Therefore, the scope of the present invention must be determined by the corresponding scope of the following claims.

What is claimed is:

1. A pump assembly, comprising: a one-piece pump head having a discharge port; a discharge member releasably secured directly to said pump head; a one-way valve between said discharge member and said pump head consisting of a flexible flapper element biased for assuming a normal position sealing said discharge port and being directly mounted by at least one of said discharge members and said pump head; said flapper element including a synthetic plastic sheet secured at one end to at least one of said discharge members and said pump head, and overlying said discharge port at its other end; said flapper element further including a resilient sheet bonded to said synthetic plastic sheet to resiliently engage the periphery of said discharge port.

2. The assembly of claim 1, wherein said flapper element includes a metallic weight bonded to at least the side of said synthetic plastic sheet opposite from said resilient sheet.

3. The assembly of claim 2, wherein said weight is brass; and including an additional brass weight substantially co-extensive with said first-mentioned weight and said resilient sheet; said additional brass weight being bonded between said synthetic plastic sheet and said resilient sheet; said synthetic plastic sheet being polypropylene and said resilient sheet being rubber.

4. A pump assembly, comprising: a one-piece pump head having a discharge port; a discharge member releasably secured directly to said pump head; a one-way valve between said discharge member and said pump head consisting of a flexible flapper element biased for assuming a normal position sealing said discharge port and being directly mounted by at least one of said discharge member and said pump head; said flapper element being sheet-like and having a sealing portion generally conforming to the configuration of said discharge port, an intermediate hinge portion of less width than said sealing portion and a mounting portion of a greater width than said hinge portion; means for securing said mounting portion to at least one of said discharge members and said pump head independently of the other; said mounting portion being substantially the same width as said sealing portion, and said intermediate hinge portion constituting hinge means for permitting universal rotation and pivotal movement of said sealing portion as a whole with respect to said mounting portion under the influence of normal pump discharge flow from said discharge port into said discharge member.

5. The assembly of claim 4, wherein said mounting portion is clamped along its entire width between said discharge member and said pump head.

6. The assembly of claim 4, wherein said sealing portion, said hinge portion and said mounting portion are formed as a one-piece synthetic plastic sheet with said hinge portion being inherently resilient to constitute the sole resilient means biasing said sealing portion into its normal position.

7. The assembly of claim 6, wherein said pump head includes an annular groove around the periphery of the discharge port and opening axially toward said flapper element; including a resilient ring secured within said annular groove and extending axially beyond said groove for seating engagement with said flapper element.

8. The assembly of claim 4, wherein said discharge member has a machined face generally surrounding said discharge port; said pump head having a first machined valve seating surface surrounding said discharge port and a second machined surface parallel with said first machined surface and spaced outwardly therefrom in the axial and radial directions with respect to said discharge port and engaging around its entire periphery said machined face of said discharge member; a recess formed in said machined face of said discharge member of a depth equal to and receiving therein said mounting portion of said flapper element; a recess in said second machined surface of said pump head; a releasable fastening means having a head portion freely extending into said recess in said second machined surface of said pump head, and a securing portion extending through said flapper element mounting portion and engagingly into said discharge member; said mounting portion of said flapper element being clamped between the bottom of said recess in said machined face of said discharge member and said second machined surface of said pump head.

9. The assembly of claim 8, wherein said flapper element has an axis of symmetry extending through said sealing portion, said hinge portion and said mounting portion; said hinge portion having a channel transverse to said axis of symmetry and opening towards said pump head to form an adjacent hinge area of reduced sheet thickness; said channel being axially, with respect to said discharge port, aligned with the edge of said second machined surface adjacent said first machined surface for stress relief.

10. The assembly of claim 4, wherein said discharge member has a cross-sectional configuration, as viewed in a plane perpendicular to the axial extent of said discharge port and immediately adjacent thereto, that is generally circular except for a chordal portion immediately above and generally co-extensive with the width of said mounting portion of said flapper element.

11. The assembly of claim 4, wherein said discharge member diverts the fluid flow from said discharge port to a different flow direction; means at the end of said discharge member opposite from said pump head for releasably attaching a conduit; said pump head having means for rotatably mounting a pump impeller shaft.

12. The assembly of claim 4, wherein each of said discharge element and said pump head is a one-piece casting.

13. A check valve comprising: a member having a fluid passageway; a flapper element having a sealing portion resiliently mounted for movement between a closed positon overlying the passageway and an open position spaced therefrom; a groove surrounding the passageway; a resilient sealing member surrounding the passageway and secured within said groove, said sealing member engaging said flapper element sealing portion around the entire periphery of the passageway in the closed position; said sealing portion having a metallic disc non-corrosive to water and engaging said resilient sealing member in the closed position, and a synthetic sheet secured to the opposite side of said metallic disc from said resilient sealing member; and including a one piece synthetic sheet including a mounting portion, said sealing portion synthetic sheet and an intermediate hinge portion of less width than said sealing portion and said mounting portion.

14. A check valve according to claim 13, including an additional metallic disc substantially co-extensive with said first mentioned disc and secured on the opposite side of said sealing portion synthetic sheet from said first mentioned disc; a rivet extending through said discs and said sealing portion synthetic sheet; said member having said passageway therein being of a material highly corrosive to water; said resilient sealing member extending toward said flapper element a substantial distance beyond the adjacent portions of said passageway member.

15. A one-way valve, comprising: a rigid member forming a fluid passageway and having an edge adjacent said passageway; a resilient, flexible, one-piece sheet having a mounting portion, a sealing portion generally overlying said passageway in the closed position of the valve, and an intermediate hinge portion; means for securing said mounting portion in a fixed position with respect to said rigid member with said hinge portion immediately adjacent to said edge; a groove in said sheet directly opposite from and opening toward said edge in the closed position of the valve to constitute means for relieving stresses that would otherwise concentrate along said edge if the sheet were of uniform thickness to engage said edge; and said groove constituting weakened hinge means generally perpendicular to a radius extending from the geometric center of the passageway through said hinge portion.

References Cited

UNITED STATES PATENTS

| | | | |
|---|---|---|---|
| 338,609 | 3/1886 | Nysewander | 137—525.7 |
| 433,406 | 7/1890 | Hopkins | 137—525.7 X |
| 1,739,838 | 12/1929 | Johnson | 417—566 X |
| 2,386,485 | 10/1945 | Longenecker | 137—525.7 X |

ROBERT M. WALKER, Primary Examiner

U.S. Cl. X.R.

137—525.7